(12) United States Patent
Browne et al.

(10) Patent No.: US 7,631,915 B2
(45) Date of Patent: Dec. 15, 2009

(54) ACTIVE MATERIAL ENABLED SELF-ACTUATED DEVICES

(75) Inventors: Alan L. Browne, Grosse Pointe, MI (US); Louise E. Stauffer, Bloomfield Hills, MI (US); Roy J. Mathieu, Rochester Hills, MI (US); Joseph F. Szczerba, Grand Blanc, MI (US); Nancy L. Johnson, Northville, MI (US)

(73) Assignee: GM Global Technology Operations, Inc, Detroit, MI (US)

( * ) Notice: Subject to any disclaimer, the term of this patent is extended or adjusted under 35 U.S.C. 154(b) by 0 days.

(21) Appl. No.: 12/199,884

(22) Filed: Aug. 28, 2008

(65) Prior Publication Data

US 2009/0108607 A1    Apr. 30, 2009

Related U.S. Application Data

(60) Provisional application No. 60/983,816, filed on Oct. 30, 2007.

(51) Int. Cl.
*B60R 13/02* (2006.01)
(52) U.S. Cl. ..................... 296/1.02; 16/110.1
(58) Field of Classification Search ............... 296/1.02, 296/214; 16/110.1, 446
See application file for complete search history.

(56) References Cited

U.S. PATENT DOCUMENTS

| | | | |
|---|---|---|---|
| 5,820,205 A | 10/1998 | Ammons | |
| 6,431,643 B2 * | 8/2002 | Grey | 296/214 |
| 6,979,050 B2 | 12/2005 | Browne et al. | |
| 6,991,280 B2 | 1/2006 | McKnight et al. | |
| 7,108,301 B2 | 9/2006 | Louvel | |
| 7,176,413 B2 | 2/2007 | Zanella et al. | |
| 7,252,313 B2 | 8/2007 | Browne et al. | |
| 7,331,616 B2 | 2/2008 | Brei et al. | |
| 7,332,688 B2 | 2/2008 | Browne et al. | |
| 2004/0031301 A1 | 2/2004 | Dominique | |
| 2004/0195815 A1 * | 10/2004 | Browne et al. | 280/753 |
| 2006/0267376 A1 | 11/2006 | McKnight et al. | |
| 2007/0216194 A1 | 9/2007 | Rober et al. | |
| 2007/0278756 A1 * | 12/2007 | Erskine | 280/47.25 |
| 2008/0133090 A1 | 6/2008 | Browne et al. | |

* cited by examiner

*Primary Examiner*—Joseph D Pape
(74) *Attorney, Agent, or Firm*—Quinn Law Group, PLLC

(57) ABSTRACT

A self-actuating device includes a member in physical communication with a vehicle surface and an active material. The member is configured to have at least a first form and a second form, wherein one of the first form and the second form is configured to stow the member and the other of the first form and the second form is configured to present the member. The active material is in operable communication with the member. The active material is configured to undergo a change in at least one property upon receipt of an activation signal and the change in at least one property is effective to transition the member from one of the forms to another of the forms.

16 Claims, 11 Drawing Sheets

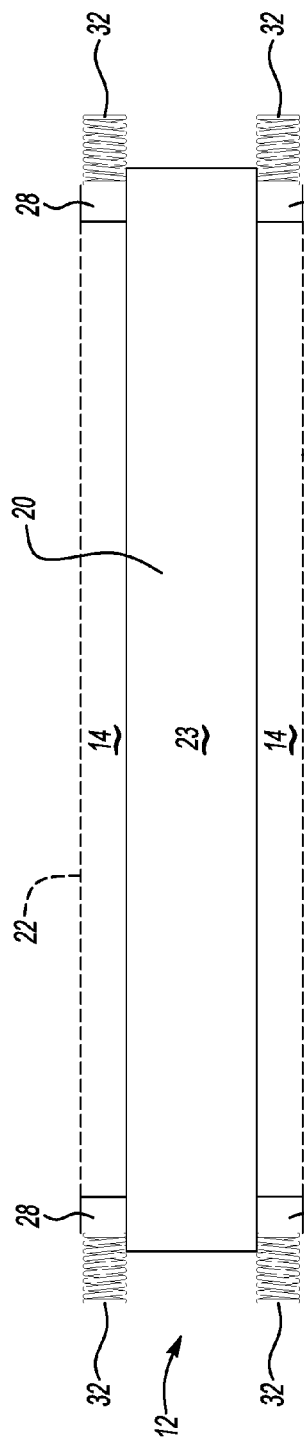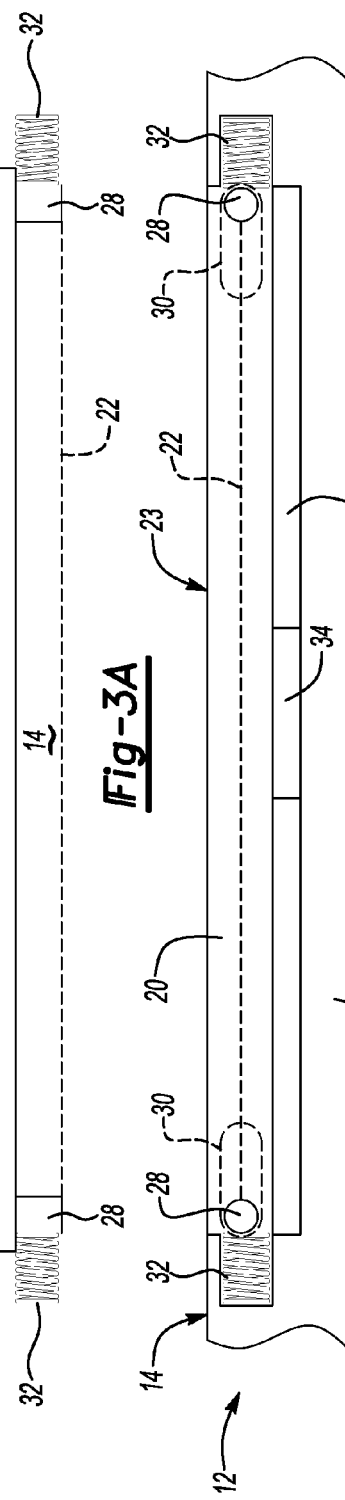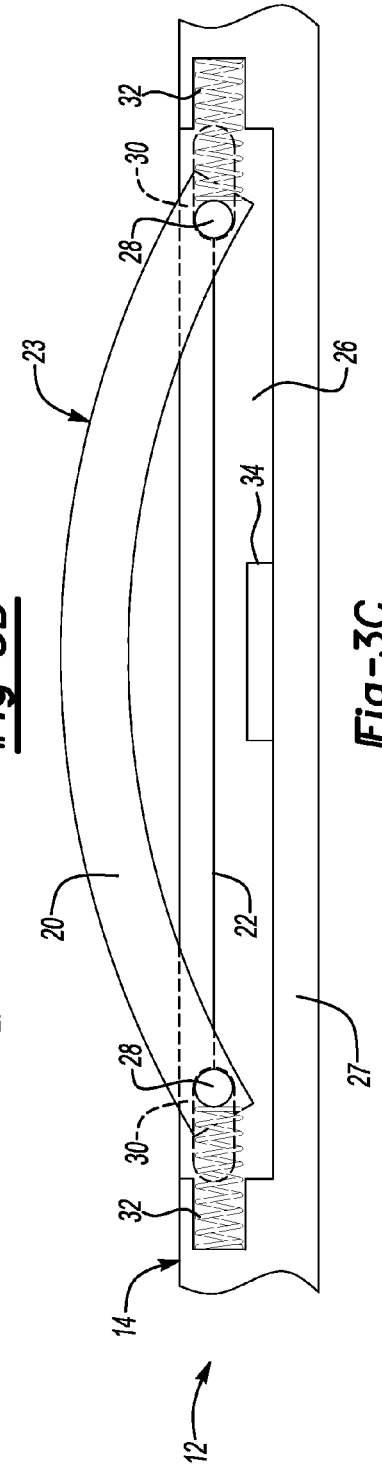

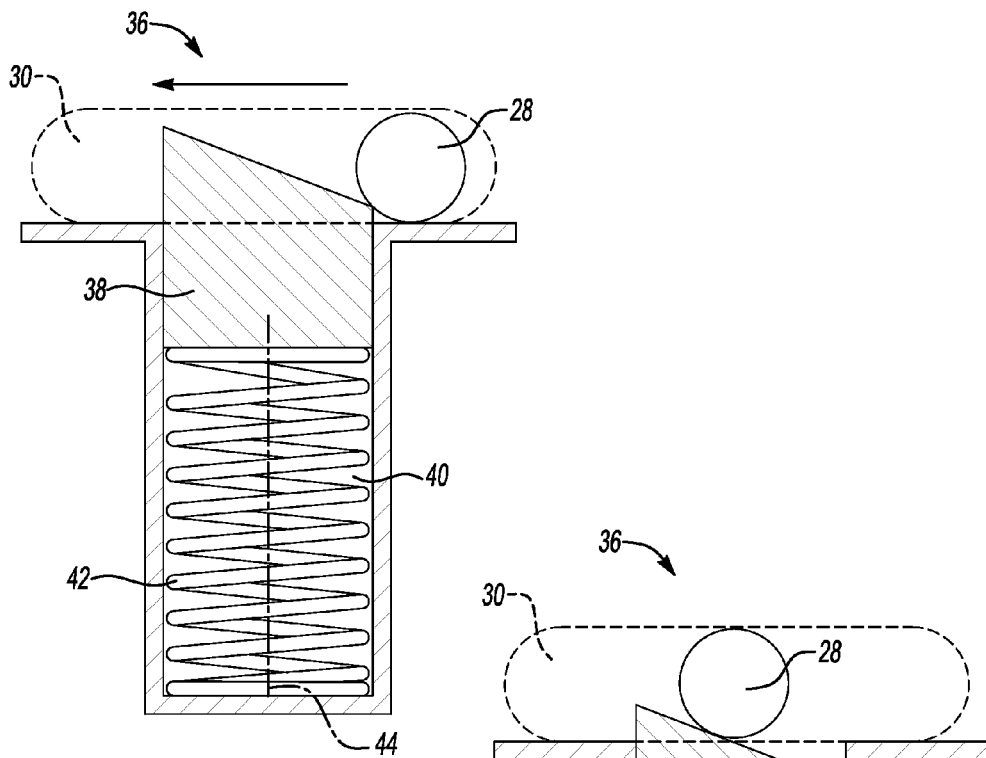
Fig-4A
Fig-4B
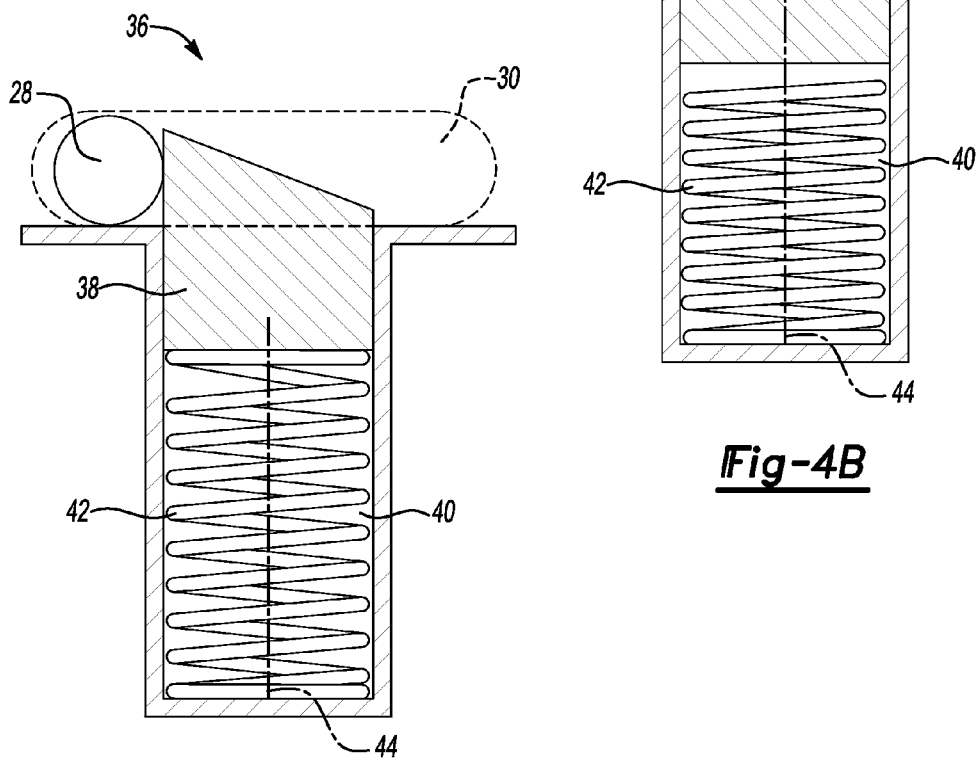
Fig-4C

ACTIVE MATERIAL ENABLED SELF-ACTUATED DEVICES

CROSS-REFERENCE TO RELATED APPLICATIONS

This application claims the benefit of U.S. Provisional Application 60/983,816, filed Oct. 30, 2007, which is hereby incorporated by reference in its entirety.

TECHNICAL FIELD

The present invention relates generally to stowable devices that adopt a functional geometry only upon demand and, more particularly to stowable devices that either present this functional geometry to the user for enhanced ease of use or stow the functional geometry to provide enhanced interior spaciousness and flush exterior profiles for improved aerodynamic and appearance differentiation. These devices will be termed self-presenting devices and this invention particularly addresses self-actuating handles that include active materials.

BACKGROUND OF THE INVENTION

Motor vehicles and other transportation means such as airplanes, busses and trains have multiple handles, levers, hooks, and the like on the exterior and throughout the interior compartment. In motor vehicles, for instance, such devices have a myriad of uses, such as grab handles for assisting egress/ingress from the vehicle, hood and/or trunk-release handles, door handles, garment hooks, tailgate handles, liftgate assist handles and the like. Most, if not all, of these devices are infrequently used but are permanently fixed to the vehicles interior and/or exterior. For example, in the case of an interior grab handle, the handle permanently occupies interior space and affects interior styling design.

Accordingly, there is a need for improved self-actuating devices that do not affect styling designs and aesthetics, and in the case of the interior compartment, devices that increase interior space.

SUMMARY OF THE INVENTION

Disclosed herein are active material enabled self-actuating devices, including self-presenting devices and self-stowing devices in accordance with exemplary embodiments.

In one embodiment, a self-presenting device is provided. The self-presenting device includes a member in physical communication with a surface and an active material in operable communication with the member. The member is configured to have a first form and a second form. The first form is configured to stow the member and the second form is configured to present the member. The active material is configured to undergo a change in at least one property upon receipt of an activation signal and the change in at least one property is effective to transition the member from the first form to the second form.

In another embodiment, a self-stowing device is provided. The self-stowing device includes a member in physical communication with a surface and an active material in operable communication with the member. The member is configured to have a first form and a second form. The first form is configured to present the member and the second form is configured to stow the member. The active material is configured to undergo a change in at least one property upon receipt of an activation signal and the change in at least one property is effective to transition the member from the first form to the second form.

In yet another embodiment, a self-presenting handle assembly includes a handle portion in operative communication with an axle rotatably mounted in a housing of a rigid support, and an active material in operative communication with the axle or the handle portion. The active material is configured to undergo a change in at least one property upon receipt of an activation signal and the change in at least one property is effective to provide rotation of the axle in a first direction and move the handle in the first direction from a first position to a second position.

In yet another embodiment, a self-presenting handle assembly includes a handle portion in operative communication with an axle rotatably mounted in a housing of a rigid support and a first shape memory alloy in operative communication with the axle. The shape memory alloy is configured to undergo a contraction in a length dimension upon receipt of a first heat signal. The contraction in a length dimension is effective to provide rotation of the axle in a first direction and move the handle in the first direction from a stowed position relative to a vehicle interior surface to a presented position relative to the vehicle interior surface.

A locking mechanism is provided, which is in operative communication with the handle portion configured to hold the handle portion in the presented position. The locking mechanism comprises a second shape memory alloy configured to undergo a contraction in a length dimension upon receipt of a second heat signal. The contraction in a length dimension is effective to release the locking mechanism from the handle portion; and a bias spring in operative communication with the axle is configured to provide rotation of the axle in a second direction counter to the first direction. The rotation of the axle is effective to move the handle portion from the presented position back to the stowed position.

Alternatively, in another embodiment, an antagonistic arrangement of active material activated actuators is provided, in place of the locking mechanism and biasing return spring, to rotate the handle portion between the first position and the second position.

A method of self-presenting a device is provided, which includes activating an active material in operative communication with a member and transitioning the member from the first form, which is configured to stow the member, to the second form, which is configured to present or deploy the member. The active material is configured to undergo a change in at least one property upon receipt of a first activation signal and the change in the property is effective to transition the member from the first form to the second form.

A method of self-presenting a handle in a vehicle includes activating an active material in operative communication with the axle or the handle portion. The active material is configured to undergo a change in at least one property upon receipt of an activation signal. The change in the at least one property is effective to provide rotation of the axle in a first direction and move the handle in the first direction from a first position to a second position.

A method of self-stowing a device is provided, which includes activating an active material in operative communication with a member and transitioning the member from a first form, which is configured to present or deploy the member, to the second form, which is configured to stow the member. The active material is configured to undergo a change in at least one property upon receipt of a first activation signal and the change in the property is effective to transition the member from the first form to the second form.

The above features and advantages and other features and advantages are readily apparent from the following detailed description of the preferred embodiments when taken in connection with the accompanying drawings.

BRIEF DESCRIPTION OF THE DRAWINGS

Referring now to the figures, which are exemplary embodiments and wherein the like elements are numbered alike:

FIG. 3A is a plan view of another exemplary embodiment of an active material enabled self-presenting device according to the present invention;

FIG. 3B is a side view of the exemplary embodiment of the active material enabled self-presenting device of FIG. 3A in a stowed position;

FIG. 3C is a side view of the exemplary embodiment of the active material enabled self-presenting device of FIG. 3A in a presented position;

FIG. 4A is a side view of an exemplary embodiment of a locking mechanism for an active material enabled self-presenting device according to the present invention in a retracted position;

FIG. 4B is a side view of the exemplary embodiment of a locking mechanism for the active material enabled self-presenting device of FIG. 4A in a transition position;

FIG. 4C is a side view of the exemplary embodiment of a locking mechanism for the active material enabled self-presenting device of FIG. 4A in a locked position;

DETAILED DESCRIPTION

Figure 1:
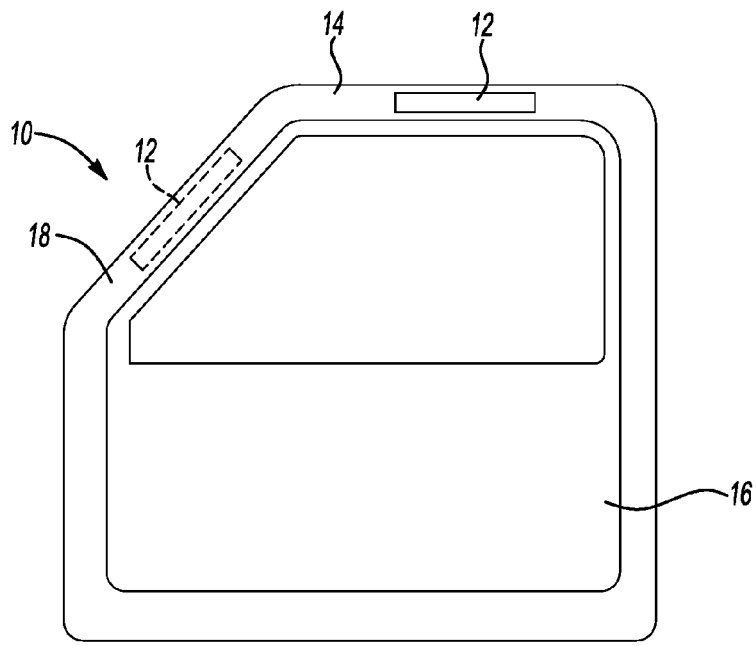
FIG. 1 is a plan view of a door in a vehicle interior compartment with an active material enabled self-presenting device according to the present invention.

Self-actuating devices include both self-presenting devices and self-stowing devices. Self-presenting devices include devices that are initially stowed substantially flush to or within an interior or exterior trim panel and presented for use by a user by activation of an active material. Self-stowing devices include devices that are initially visible and available for use by a user in a presented configuration and stowed substantially flush to or within an interior or exterior trim panel upon activation of an active material.

Self-presenting devices, self-stowing devices and methods of their use in a vehicle are described herein. In contrast to existing handles, garment hooks, and the like, the self-presenting devices disclosed herein advantageously employ active materials. The self-actuating devices as described comprise an active material which permits the self-actuating device to reversibly present itself in response to a change in a property of the active material upon receipt of an activation signal. The term "device" as used herein generally refers to any functional component. Examples include, without limitation, grab handles, garment hooks, door handles, hood releases, trunk releases, fuel-door releases, tailgate handles, liftgate assist handles, and the like, found in most transportation means, and more specifically in a motor vehicle.

The self-presenting devices as disclosed herein, however, have general utility beyond transportation means. The self-presenting devices can be employed in other applications such as, without limitation, luggage, shipping containers, and the like, where a permanently affixed, protruding handle could advantageously be replaced by the self-presenting handle disclosed herein. The term "active material" as used herein generally refers to a material that exhibits a change in a property such as dimension, shape, phase, orientation, stiffness, and the like upon application of an activation signal. Suitable active materials include, without limitation, shape memory alloys (SMA), ferromagnetic shape memory alloys (MSMA), shape memory polymers (SMP), piezoelectric materials, electroactive polymers (EAP), magnetorheological (MR) elastomers, electrorheological (ER) elastomers, and the like. Depending on the particular active material, the activation signal can take the form of, without limitation, an electric current, an electric field (voltage), a temperature change, a magnetic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

Referring now to FIG. 1, a partial perspective view of a vehicle interior compartment is illustrated and generally designated by reference numeral 10. In this embodiment, a self-presenting device 12, in this case a grab handle, is in physical communication with a vehicle surface 14, in this case a roof line of the vehicle interior compartment 10, just above a vehicle door 16. In another embodiment, the self-presenting device 12 can be located on the vehicle's A-pillar 18. While the self-presenting device 12 in this embodiment is a grab handle (i.e., assist handle), it is to be understood that the active material enabled self-presenting devices disclosed herein can be used for any functional component, such as garment hooks, hoods, trunks, and fuel-door release handles, door handles, tailgate assist handles, and the like, and can be disposed anywhere on and/or in the vehicle.

Figure 2A:
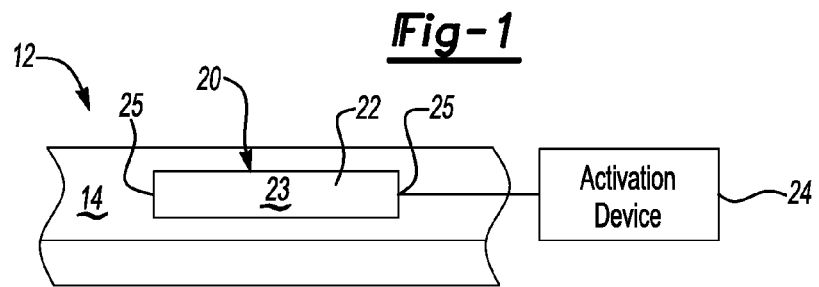
FIG. 2A is plan view of an exemplary embodiment of an active material enabled self-presenting device according to the present invention in a stowed position.
Figure 2B:
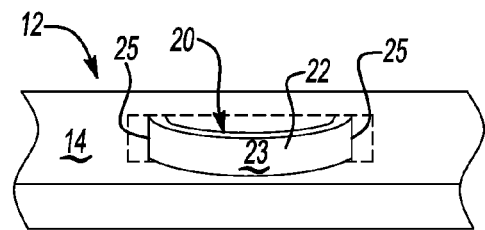
FIG. 2B is a plan view of the exemplary embodiment of the active material enabled self-presenting device of FIG. 2A in a presented position where ends of the member are movable.
Figure 2C:
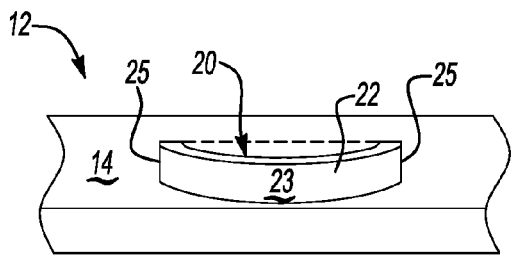
FIG. 2C is a plan view of the exemplary embodiment of the active material enabled self-presenting device of FIG. 2A in a presented position where ends of the member are fixed.

In FIGS. 2A-2C, the self-presenting grab handle 12 is shown in greater detail. The self-presenting grab handle 12 comprises a member 20 and an active material 22. In this embodiment, the member 20 is comprised of the active material 22. In other embodiments, the active material 22 can be one or more strips, wires, cables or other geometric forms of active material within the member 20; can be embedded partially or fully within the member 20; or can be a coating or layer on the member 20. Moreover, the active material 22 does not need to be in direct communication with the member 20, rather, the active material 22 can be in communication with the member 20 remotely. Upon receipt of an activation signal from an activation device 24, the active material 22 is configured to undergo a change in a property. The change in the property of the active material 22 is effective to alter one or more features of the member 20 such as, but not limited to, shape, dimension, location, orientation, stiffness, combinations thereof, and the like.

In an exemplary embodiment, the member 20 has a first form, i.e. structure, position, or shape, as shown in FIG. 2A, wherein the active material 22 is in a passive mode, i.e., wherein no activation signal is being applied to the active material 22. The first form of the member 20 can comprise a surface 23 that is coplanar to the surface 14 of the vehicle, such as the roof line, and is configured to stow the self-presenting device 12. Upon receipt of an activation signal from the activation device 24, the change in a property of the active material 22 is effective to transition the member 20 to a second form, as shown in FIG. 2B or FIG. 2C. The second form is configured to present, i.e., deploy, the member 20 thereby making it accessible to a user. As used herein, the term "stow" generally refers to a position of the self-presenting device in which the self-presenting device occupies less vehicle interior space or protrudes less from an exterior surface over current vehicle functional components and the self-presenting device itself when in the presented position. For example, in one embodiment, the self-presenting device, when stowed, is recessed into a cavity or a holder which is located within the vehicle compartment 10.

In another embodiment, the self-presenting device can simply be folded to increase interior compartment space, but is not completely recessed into the vehicle interior, such that the surfaces of the self-presenting device and the vehicle interior are not coplanar (i.e., flush).

The activation device 24 is coupled to and in operative communication with the self-presenting device 12. The activation device 24 is operable to selectively provide an activation signal to the self-presenting device 12 to alter a feature of the member 20 by changing at least one property of the active material 22. The activation signal provided by the activation device 24 can include a heat signal, a magnetic signal, an electrical signal, a pneumatic signal, a mechanical signal, and the like, and combinations comprising at least one of the foregoing signals, with the particular activation signal dependent on the materials and/or configuration of the active material. For instance, a heat signal may be applied for changing the property of the active material fabricated from SMA and/or SMP. An electrical signal may be applied for changing the property of the active material fabricated from electronic EAP's. A magnetic field may be applied (removed or changed) to alter the property of the active material fabricated from magnetostrictive materials such as MSMA and MR elastomers.

In one embodiment, the active material enabled self-presenting device 12 can reversibly self-present by bowing the member 20. As seen in FIG. 2A, when in the first form, the member 20 comprised of the active material 22 has a substantially straight and/or planar shape. Upon exposure to an activation signal from the activation device 24, the active material 22 undergoes a change in a property. The change in a property is effective to transition the member 20 from the first form to the second form. In this embodiment, the transition from the first form to the second form comprises moving the ends 25 of the member 20 such that the distance between the two ends 25 decreases causing the member 20 to bow outward away from the vehicle surface 14 and inward toward the vehicle interior compartment 10.

Referring now to FIGS. 3A-3C, the self-presenting device of FIG. 2A is illustrated in greater detail. FIG. 3A illustrates a plan view of the self-presenting device 12 comprising the member 20 set in a cavity 26 formed by a frame 27. FIG. 3B shows a side view of the self-presenting device 12 and demonstrates that the surface 23 of the member 20, when in the first form (i.e., stowed and substantially flat), is flush with the vehicle surface 14 of the frame 27. Moreover, the member 20, when in the first form, has the same plain view dimension as the cavity 26 and, therefore, fills the cavity 26 such that the member/cavity combination approximates a single unbroken surface. Pins 28 are rigidly attached to the member 20 and are constrained to travel within slots 30 of the frame 27. The pins 28 protrude laterally from the member 20. The pins 28 are connected to one another by the active material 22; in this embodiment SMA wires. In this figure, the SMA wires 22 are shown mounted on each side of the member 20.

In another embodiment, a single SMA wire, which could be centrally mounted to eliminate moments, can be used.

In operation, as illustrated in FIG. 3C, the SMA wires 22, which are martensitic at room temperature, are heated to their austenitic state by electric resistance heating (electrical wires not shown) and contract in a length dimension. The contraction is effective to overcome a restraining force exerted by return springs 32, which are mounted between the pins 28 and the frame 27. The return springs 32 are configured to stretch the member 20, which is compliant and responds by bowing into the second form, when acted on by the actuated SMA wires 22. To prevent bowing inward and to force the member 20 to deploy outward, a stop 34 is incorporated in the frame 27 to slightly bias the stowed (i.e. first form) location of the member 20 to the outward direction so that applying an axial compressive load to the member 20 would accentuate the curvature and fully deploy the member 20 for presentation to the user.

In this embodiment, the SMA wires 22 must be continually heated even after the member 20 is deployed in the second form to prevent reversion of the SMA wires 22 to the soft, martensitic state under which the return springs 32 would stretch the SMA wires and return the member 20 to the stowed, first form position. In order to have the member 20 remain deployed even when heat is removed from the SMA wires 22, a locking mechanism 36, as shown in FIGS. 4A-4C, is used.

Turning to FIGS. 4A-4C, the releasable locking mechanism 36 is configured to interact and interfere with the pin 28 being returned by the spring 32. The locking mechanism 36 comprises a wedge 38 in slidable communication with a complementary cavity 40. The wedge 38 is forced outward by a compression spring 42 located in the cavity 40. The outward motion of the wedge 38 is restrained by mechanical stops (not shown) and a length of another SMA wire 44, which extends from the base of the cavity 40 to the underside of the wedge 38.

In operation, actuation of the self-presenting device 12 causes the member 20 to bow outward from the vehicle surface 14 and the pin 28 to travel longitudinally within the slot 30. As the pin 28 moves, it encounters the ramp-shape of the wedge 38. Movement of the pin 28 against the wedge 38 drives the wedge down against the compression spring 42, as illustrated in FIG. 4B, until the pin 28 clears the wedge 38 and the compression spring 42 urges the wedge 38 upward where it acts as a stop to the return motion of the pin 28, as illustrated in FIG. 4B. When it is desired to return the self presenting device 12 to its first form (i.e. stowed position), the wedge 38 is retracted a sufficient distance into cavity 40 to eliminate any interference between the pin 28 and the wedge 38.

In the illustrated embodiment, this is accomplished by activating the SMA wire 44 and discontinuing the activating signal to the SMA wires 22 of self-presenting device 12. Hence, the pin 28 is again able to slide in the slot 30 and the return springs 32 attached to the member 20 will pull the member back to the first form (i.e. stowed position), clearing the retracted wedge 38. The SMA wire 44 in the locking mechanism 36 is then deactivated to return the self-presenting device 12 to a fully deactivated, stowed state.

In another embodiment, which may be desirable if the force necessary to depress the locking spring 36 during deployment is excessive, operation of the SMA wires 22, 44 in both the self-presenting device 12 and the locking mechanism 36 respectively are synchronized such that both are actuated independently by their individual SMA elements. In this embodiment, a wedge-shaped geometry is unnecessary. A parallel-sided locking mechanism will function adequately. Again, upon achieving a deployed configuration the supply of current to the SMA wires can be discontinued until stowage of the member is again desired.

It is to be understood that the locking mechanism 36 as described above is an exemplary embodiment. Other embodiments of locking mechanisms that function to advantageously hold the member 20 in its presented state even after the active material is deactivated are suitable. Conversely, locking mechanisms can be used to hold the member 20 in the stowed position. Suitable locking mechanisms can include, without limitation, bolts, latches, pins, and the like. When it is desired, the locking mechanism can be released and a return mechanism or a second active material component can return the member 20 to the stowed position and/or present the member 20. Also, the properties of SMA, as well as other suitable active materials, will be discussed in more detail below.

Referring back to FIGS. 2A-2C, another embodiment of the active material enabled self-presenting device 12 is illustrated in FIG. 2C, wherein the self-presenting device 12 can reversibly self-present by increasing a length dimension of the member 20. The member 20 is comprised of an active material 22 which increases in length upon receipt of an activation signal, such as for example EAP. The length of the member 20 will increase in response to the activation signal. In this embodiment, the ends 25 of the member 20 are fixed, i.e., stationary. As the active material increases the length dimension of the member 20, the member 20 is forced to bow outward because of the fixed ends 25.

Figure 5A:
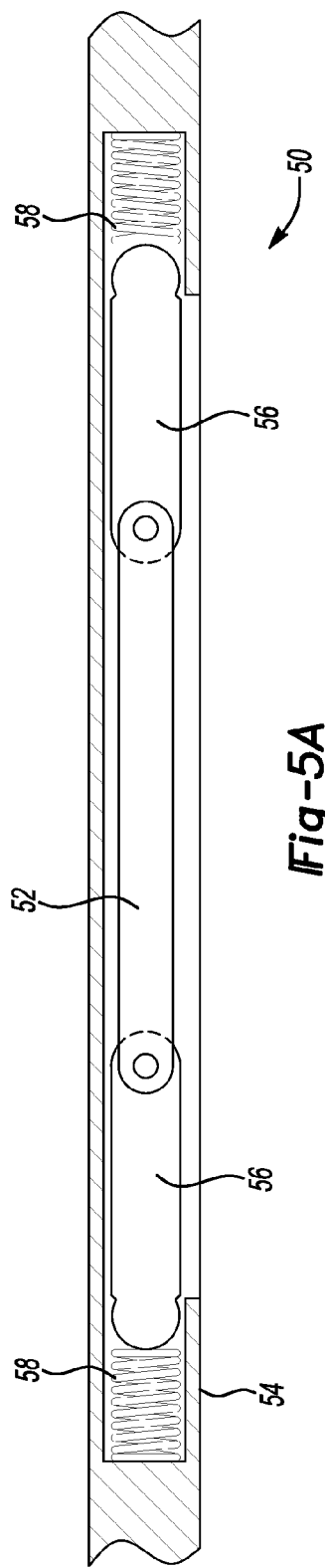
FIG. 5A is a side view of yet another exemplary embodiment of an active material enabled self-presenting device according to the present invention in a stowed position.
Figure 5B:
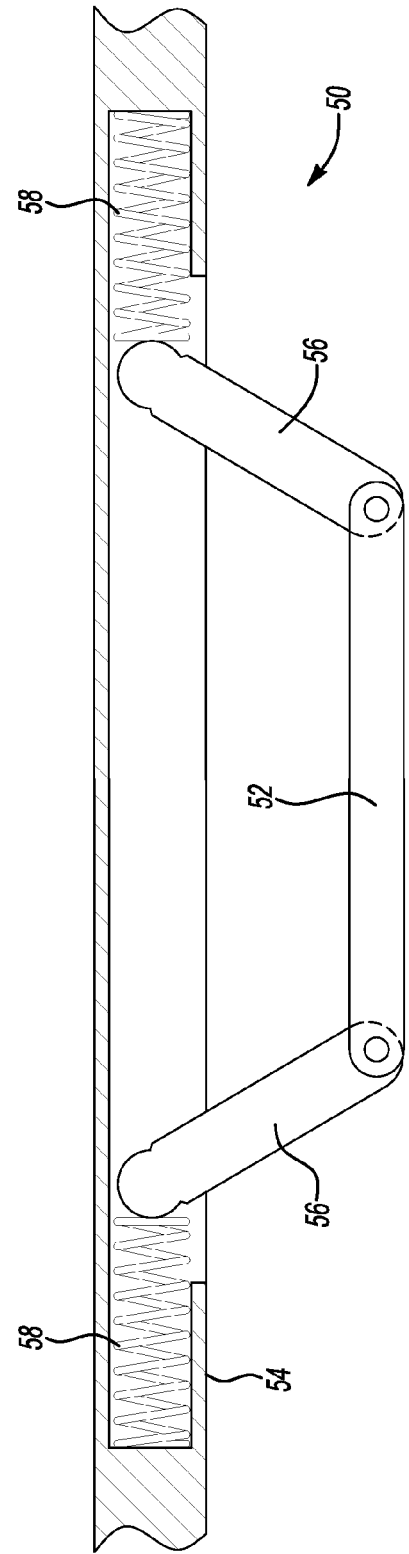
FIG. 5B is a side view of the exemplary embodiment of the active material enabled self-presenting device of FIG. 5A in a presented position.

In FIGS. 5A-5B, yet another embodiment of an active material enabled self-presenting device 50 is illustrated. The self-presenting device 50 can reversibly self-present through a rigid body translation of the member 52 toward a vehicle interior compartment 10 or outward from a vehicle exterior surface. As illustrated in FIG. 5A, the self-presenting device 50 is a grab handle positioned in a roof line 54 of a vehicle interior compartment 10. The self-presenting grab handle 50 comprises the member 52 and an active material component 56. The active material component 56 is in hingeable communication with the member 52 and the roof line 54. When the self-presenting grab handle 50 is in a first form, the member 52 is configured to be in a stowed position, against a vehicle interior component, in this case, the roof line 54. Upon receipt of an activation signal, the active material 56 undergoes a change in a property, which is effective to transition the self-presenting grab handle 50 from the first form to a second form, wherein the active material 56 hingeably translates the member 52 away from the roof line 54 and into the vehicle interior compartment 10 such that it is accessible to a user. FIG. 5B illustrates the self-presenting grab handle 50 in the presented, second form position.

In one embodiment, the reverse of the transition can be used to return the self-presenting device 50 from the second form to the first form, i.e., to stow the device. In other words, terminating the activation signal can be effective to reverse the change in a property of the active material component 56, thereby returning the member 52 from the second form to the first form.

In another embodiment, for example, those involving SMA as an active material such as in FIGS. 3A-3C, discontinuing the activation signal will result in the transformation of the SMA wire to the martensitic phase but, absent the application of a reverse force on the handle which will stretch the SMA wire and stow the handle 20, the handle 20 will remain in its deployed position. A return mechanism, such as the return spring 32 of FIGS. 3A-3C or the coil spring 58 of FIGS. 5A-5B, can be optionally used to return the self-presenting device to the opposite position upon termination of the activation signal or upon release of a locking mechanism.

For example, if an active material transitions the member 20 to the second form, presented position when activated, a return mechanism may return the member 20 to the first form, stowed position when the activation signal is terminated. The return mechanism can include, for example, a second active material arranged in an antagonistic manner with the first active material.

In another example, where a locking mechanism or the active material (when activated) holds the member 20 in the stowed position, a return mechanism can be effective to transition the member to the presented position upon release of the locking mechanism or deactivation of the active material. Such embodiments can be advantageous for those active materials which are inherently only effective as one-way actuators, for example SMA, which will be discussed in greater detail below.

Whatever the mode of activation, it is advantageous that the member be stowed when in the passive mode, therefore no power is required for the continuous storage of the self-presenting device. In other words, the only power required by the self-presenting device is for the short duration in which the member must be presented for use, such as opening of the vehicle door. If, however, for some reason the member must be presented for a longer than normal duration, or if the function of the self-presenting device is one in which prolonged deployment is required, for instance garment hooks, then a locking mechanism can be added to the self-presenting device.

Figure 6:
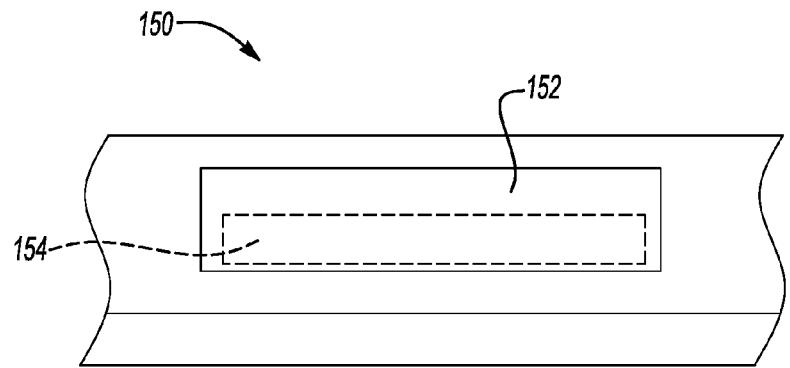
FIG. 6 is an exemplary embodiment of active material enabled self-presenting device according to the present invention comprising a concealment flap, wherein the device is in a stowed position and is concealed by the flap.

Turning now to FIG. 6, yet another embodiment of a self-presenting device 150 is illustrated. In this embodiment, the self-presenting device 150 further includes a concealment flap 152. The concealment flap 152 can be used in combination with any self-presenting device 150 where selectively covering, hiding, and/or protecting the self-presenting device 150 is beneficial. The concealment flap 152 can be used to conceal the member 154, which is shown as a dashed outline because it is hidden behind the concealment flap 152 when in the first from (stowed position). The concealment flap 152 can be configured to actively move, such as through the use of additional active materials, mechanical actuation, and the like to reveal the self-presenting device 150. Or the concealment flap 152 can be configured to passively move, wherein the concealment flap 152 is comprised of a flexible low-modulus material capable of being pushed aside by the member 154 of the self-presenting device 150 as it transitions from the first form to the second form.

Figure 7A:
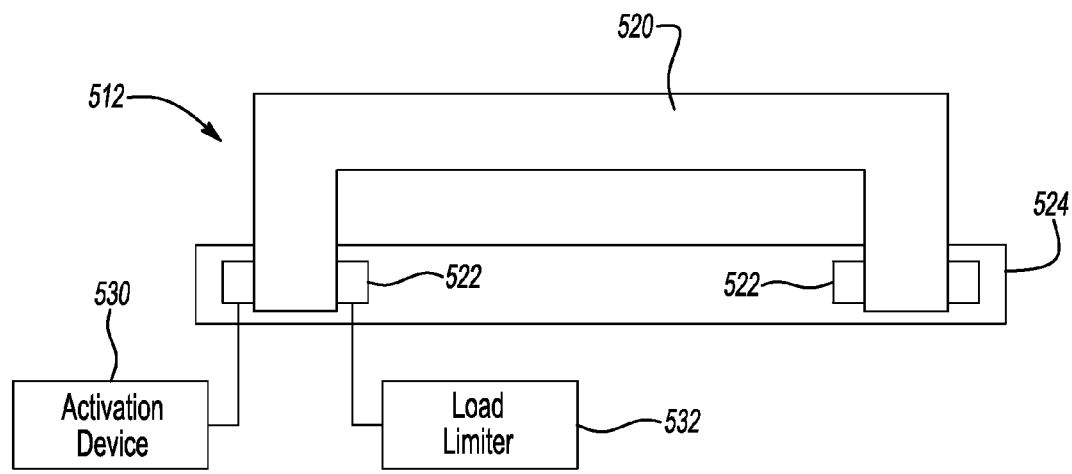
FIG. 7A is a plan view of another exemplary embodiment of an active material enabled self-presenting device according to the present invention.
Figure 7B:
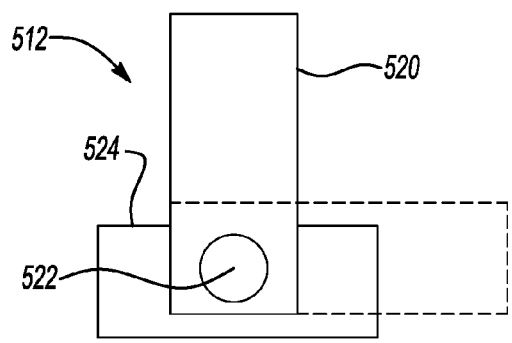
FIG. 7B is a side view of the active material enabled self-presenting device of FIG. 7A.

In yet another embodiment, as illustrated in FIGS. 7A-7B, a self-presenting handle assembly 512 comprises a handle portion 520 and axles 522 in operative communication with the handle portion 520. The axles 522 are rotatably mounted in a housing of a rigid support 524. An activation device 530 and a load limiter are coupled to and in operative communication with the self-presenting handle assembly 512. In one embodiment the rigid support 524 can be mounted directly to the vehicle interior 10, such as on vehicle surface 14. The axles 522 are configured to permit rotation of the handle portion 520 from a first position to a second position.

In one configuration, the handle portion 520 is rigidly attached to the axle 522 and an active material is in direct operable communication with either the handle portion 520 or the axle 522. Alternatively, the handle portion 520 can be rotatably mounted to the axle 522 and the active material is in direct operable communication with the handle portion 520, to allow the handle portion 520 to rotate about the axle 522.

Figure 8:
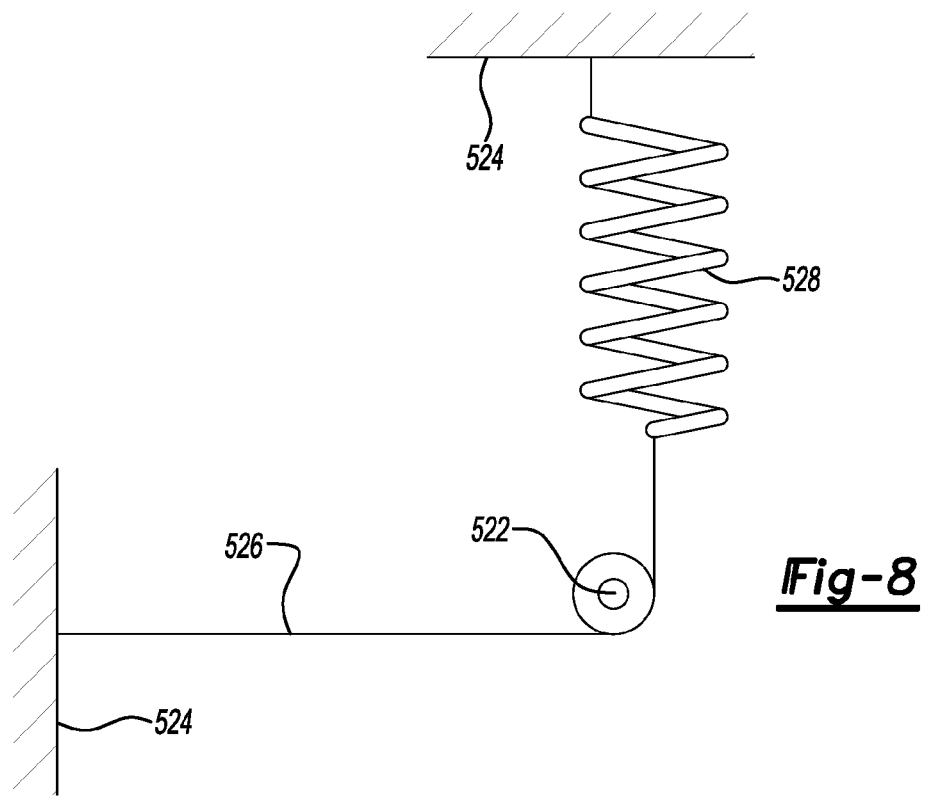
FIG. 8 is a schematic illustration of a pivot enabled by the active material enabled self-presenting device of FIGS. 7A and 7B.

Turning now to FIG. 8, one of the axles 522 is illustrated in further detail. In this embodiment, the handle assembly 512 further includes an active material 526 and a return mechanism 528. In this embodiment, the active material 526 comprises a SMA wire in operative communication with the axle 522 and the return mechanism 528, in this case a bias spring. Upon receipt of an activation signal from the activation device 530, the active material 526 is configured to undergo a change in a property. The change in the property of the active material 526 is effective to provide rotation of the axle 522 in a first direction and move the handle portion 520 from the first position to a second position.

In another embodiment, the active material 526 can be directly connected to the handle portion 520 to provide the rotation.

Referring back to FIG. 7A, the first position is where the handle portion 520 is in a stowed position relative to the surrounding surface. The second position is where the handle portion 520 is in a presented position relative to the surrounding surface and can be used by a passenger.

FIG. 7B is a side perspective view of the self-presented handle assembly 512 with the dashed lines illustrating the second position of the handle portion 520. Movement in the first direction caused by the active material 526, therefore, is effective to move the handle portion 520 from the stowed to the presented position.

In operation, the SMA wire (i.e., active material) 526, which is martensitic at room temperature and starts in a pseudoplastically strained state, is heated to its austenitic state by electric resistance heating (electrical wires not shown) and contracts in a length dimension. The contraction is effective to overcome the restraining force exerted by the bias spring 528, which can be mounted between the axle 522 or handle portion 520 and the rigid support 524. In this embodiment, the bias spring 528 is configured to provide rotation of the axle 522 in a second direction counter to the first direction upon discontinuation of the activation signal being applied to the SMA wire 526. The second direction is effective to return the handle portion 520 to the stowed position.

Figure 9:
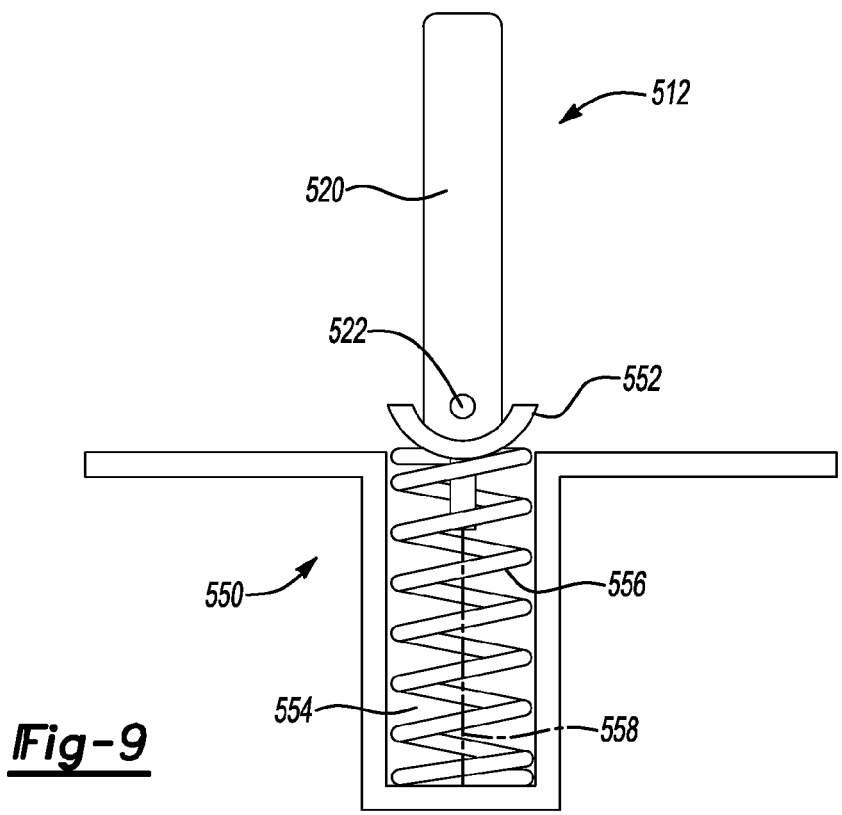
FIG. 9 is a side view of yet another exemplary embodiment of an active material enabled self-presenting device according to the present invention.

In another embodiment, referring to FIG. 9, the bias spring 528 can be configured to move the handle portion 520 from the stowed to the presented position when not acted on by the SMA wire 526. Again, the SMA wire 526 must be continually heated even after the handle portion 520 is deployed to prevent reversion of the SMA wire 526 to the soft, martensitic state under which the bias spring 528 would stretch the SMA wire and return the handle portion 520 to the first position. In order to have the handle portion 520 remain presented even when heat is removed from the SMA wire 526, a detent 550 or alternatively a locking mechanism (not shown) can be used, as illustrated in FIG. 9.

The detent mechanism 550 is operative to hold the handle portion 520 in the presented position, while still allowing the handle portion 520 to be moved manually from the presented position through the application of moderate force. Alternatively, the locking mechanism (not shown) creates a physical interlock which is operative to lock the handle portion 520 in the presented position, preventing the handle portion 520 from being moved manually, as such, the handle portion can only be moved by activating a release mechanism (i.e. deactivating the locking mechanism).

The detent mechanism 550 is configured to interact and interfere with the handle portion 520 being returned by the bias spring 528. The detent mechanism 550 comprises a catch 552 in slidable communication with a complementary cavity 554. A length of another SMA wire 558 extends from the base of the cavity 554 to the underside of the catch 552.

In an active state, an activation signal is applied to the SMA wire 558 such that the SMA wire 558 would contract, compressing the compression spring 556 and allowing the catch 552 to be pulled inward by the SMA wire 558. However, in a passive state, i.e. when the SMA 558 is not being acted upon by an activation signal, the SMA wire 558 allows the compression spring 556, which is operably connected to the catch 552, to force the catch 552 outward from the base of the cavity 554.

In operation, actuation of the self-presenting grab handle assembly 512 causes the axles 522 to rotate and move the handle portion 520. As the handle portion 520 reaches the presented position, an end of the handle encounters the catch 552, which has been forced outward by the compression spring 556. The shape of the catch 552 is configured to cradle the end of handle portion 520, effectively maintaining the handle portion 520 in the presented position even when the heat is removed from the SMA wire 526.

While the detent mechanism 550 is effective to frictionally engage the handle portion 520 in the presented position, the shape of the catch 552 is further configured to permit some movement of the handle portion 520. For example, the handle portion 520 can rotate within the U-shape of the catch 552 to permit movement (e.g. fumbling or wiggling) as a passenger makes use of the handle, without allowing the handle to move completely out of the catch 552, which would cause the handle to stow.

Activation of the SMA wire 558 and discontinuing the activation signal to the SMA wire 526 will retract the catch 552 downward such that the axles 522 are able to rotate and the bias spring 528, attached to the handle portion 520, will move the handle portion in the opposite direction back to the stowed position, clearing the retracted catch 552. The SMA wire 558 in the detent mechanism 550 can then be deactivated to return the self-presenting handle assembly 512 to a fully deactivated, stowed state.

In another embodiment, which may be desirable if the force necessary to depress the detent mechanism 550 during deployment is excessive, would be to synchronize the operation of the SMA wires 526, 558 in both the self-presenting handle 512 and the detent mechanism 550 so that both are actuated independently by their individual SMA elements. Again, upon achieving a presented configuration, the supply of current to the SMA wires can be discontinued until stowage of the handle is again desired. It is to be understood that the detent mechanism 550 as described above is an exemplary embodiment. Other embodiments of detent and locking mechanisms that advantageously provide a catch portion for the handle portion in its presented state, even after the active material is deactivated, are suitable.

Figure 10A:
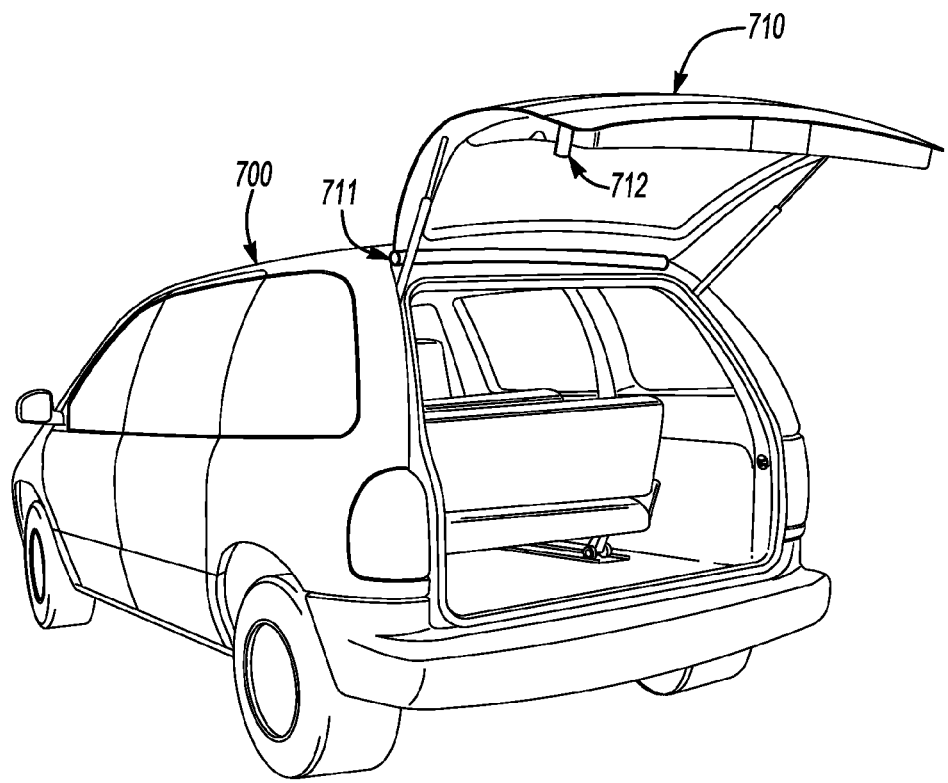
FIG. 10A is a perspective view of a vehicle including a vehicle rear door or tailgate in an open position, wherein the tailgate includes an exemplary embodiment of an active material enabled self-presenting device according to the present invention in a presented or deployed configuration.
Figure 10B:
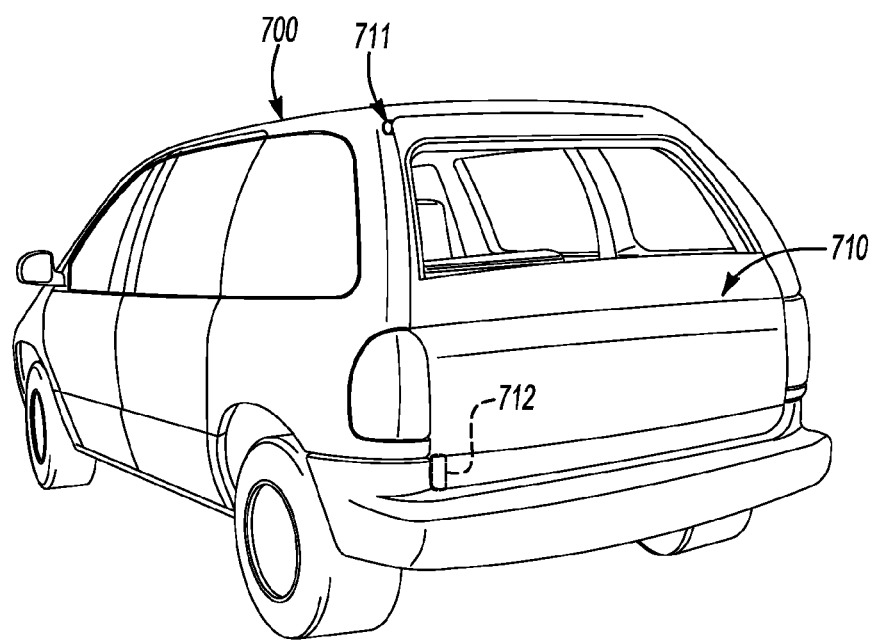
FIG. 10B is a perspective view of the vehicle illustrated in FIG. 10A including the vehicle rear door or tailgate in a closed position, wherein the tailgate includes the exemplary embodiment of the active material enable self-presenting device according to the present invention in a stowed configuration.

Referring to FIGS. 10A-10B, a vehicle 700 including a vehicle rear door, liftgate or tailgate 710 pivotable about a pivot point 711 from an open position to a closed position is illustrated. In FIG. 10A, the vehicle rear door or tailgate 710 is shown in the open position. A self-presenting device 712 is shown in a generally presented or deployed configuration, extending generally downward from the vehicle rear door or tailgate 710.

In FIG. 10B, the vehicle rear door or tailgate 710 is shown in the closed position. The self-presenting device 712 is shown in a generally stowed configuration, stowed within the vehicle rear door or tailgate 710.

Figure 11A:
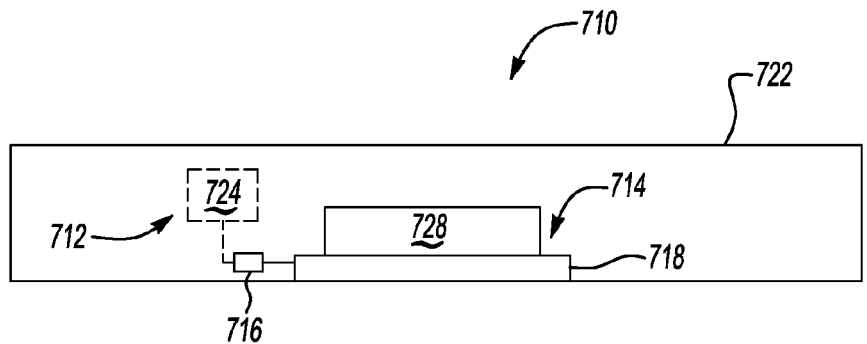
FIG. 11A is an end view of a tailgate including an exemplary embodiment of an active material enabled self-presenting device according to the present invention in a stowed configuration.
Figure 11B:
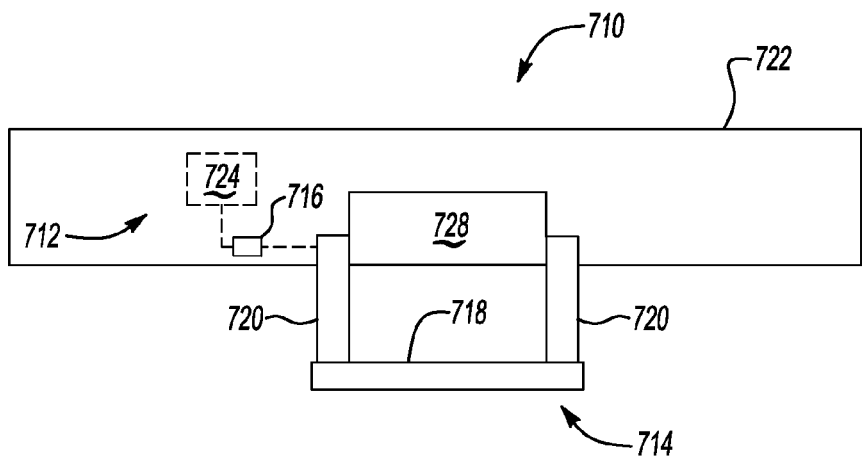
FIG. 11B is an end view of the tailgate including the exemplary embodiment of the active material enabled self-presenting device of FIG. 11A in a presented or deployed configuration.
Figure 11C:
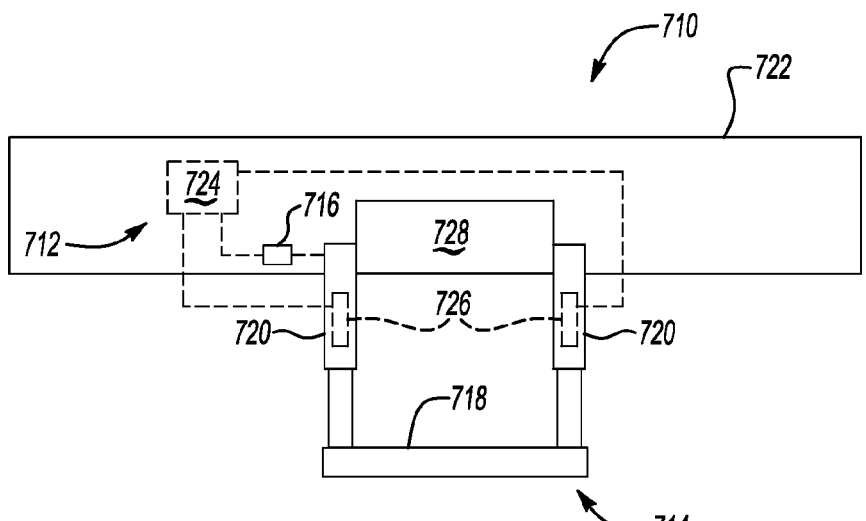
FIG. 11C is an end view of the tailgate including the exemplary embodiment of the active material enabled self-presenting device of FIGS. 11A and 11B in an extended presented or extended deployed configuration.

Referring to FIGS. 11A-11C, an end or bottom view of the vehicle rear door or tailgate 710 is illustrated. In this embodiment, the self-presenting device is generally illustrated as reference numeral 712 and comprises a member 714 and active material, shown schematically as reference numeral 716. The member 714 includes a handle portion 718 and a pair of handle arms 720.

The self-presenting device 712, in this case, a tailgate assist handle, is in physical communication with a vehicle interior trim panel 722 and illustrated in a first position, i.e. a stowed position, in FIG. 11A. In this configuration, the active material 716 is in a passive mode, i.e. where no activation signal is being applied to the active material 716. Upon receipt of an activation signal from an activation device 724, however, a change in a property of the active material 716 is effective to transition the member 714 to a second position, i.e. a presented or deployed position, as illustrated in FIG. 11B.

Finally, as illustrated in FIG. 11C, the self-presenting device 712 is transitioned to a third position, i.e. an extended presented or an extended deployed position. In this example, the pair of handle arms 720 is a pair of telescoping handle arms, which telescope from a retracted position, as illustrated in FIG. 11B, to an extended position, as illustrated in FIG. 11C.

The extension and retraction of the telescoping handle arms 720 is effected using another active material, illustrated schematically as reference numeral 726, that is effected to transition the self-presenting device 712 from the presented or deployed position where the pair of handle arms 720 are in the retracted position, as illustrated in FIG. 11B, to the extended presented or extended deployed position where the pair of handle arms 720 are in the extended position, as illustrated in FIG. 11C.

In this configuration, the active material 726 is in a passive mode when the pair of handle arms 720 is in the retracted position, as illustrated in FIG. 11B. Upon activation of an activation signal from an activation device 724, however, a change in property of the active material 726 is effective to transition the pair of handle arms 720 from the retracted position, illustrated in FIG. 11B, to the extended position, illustrated in FIG. 11C.

In the illustrated embodiment, the activation device 724 that is operable to apply an activation signal to the active material 726 is the same activation device that is operable to apply an activation signal to the active material 716; however, a second separate activation device (not shown) could be employed to apply the activation signal to the active material 726.

Upon deployment of the self-presenting device 712 to the third position, a user grabs the handle portion 718 to pull the tailgate door 710 to the closed position. A clearance pocket 728 is disposed in the vehicle interior trim panel 722, to provide clearance for a user's hand, such that, during operation, the user can grasp the handle portion 718 through a greater range of closure.

Figure 12A:
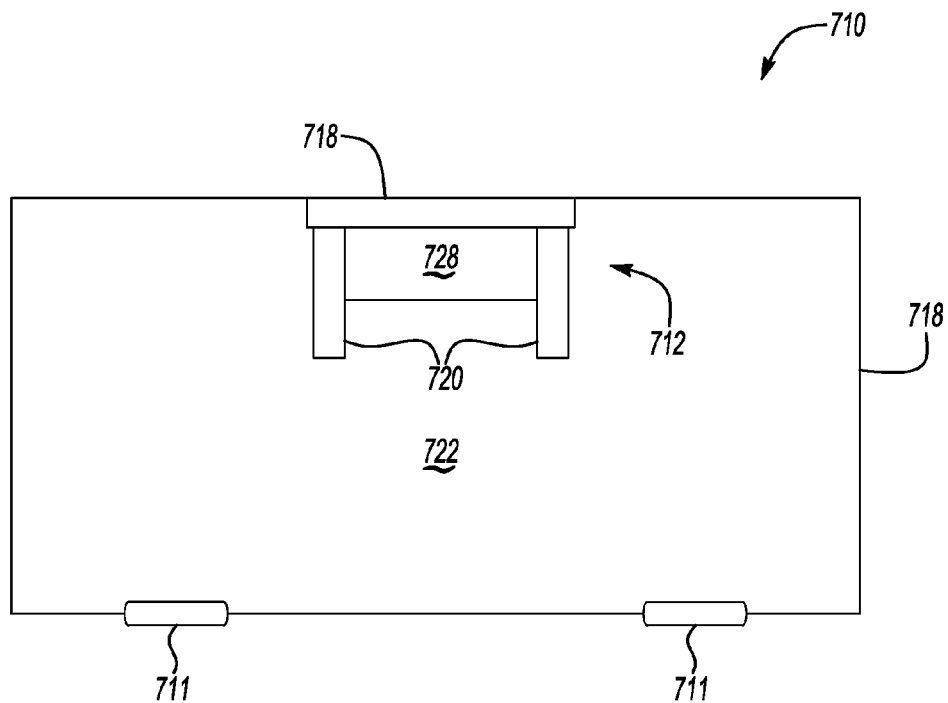
FIG. 12A is a plan view of an interior of a tailgate including an exemplary embodiment of an active material enabled self-presenting device according to the present invention in a stowed configuration.
Figure 12B:
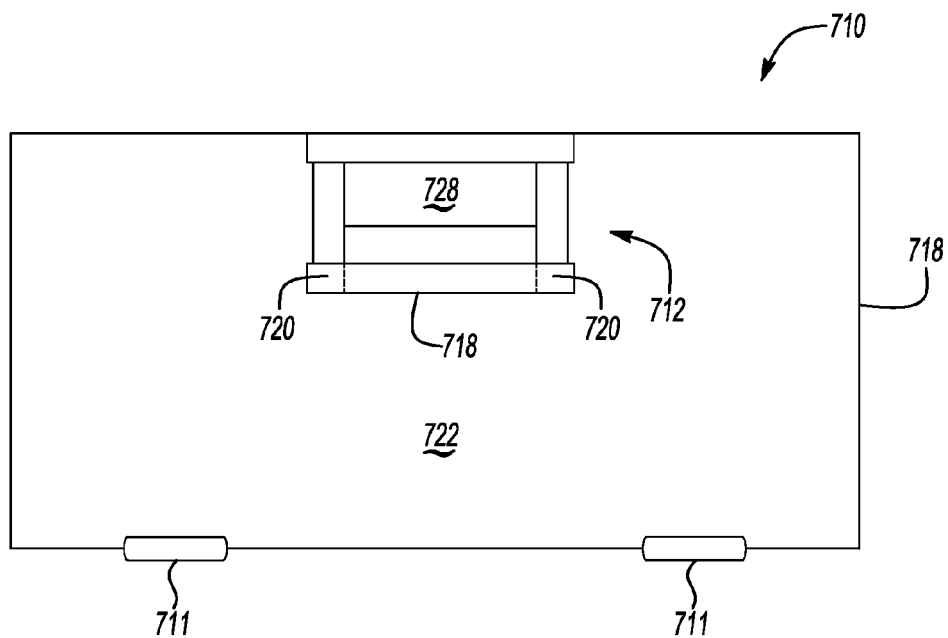
FIG. 12B is a plan view of the interior of the tailgate of FIG. 12A including the exemplary embodiment of the active material enabled self-presenting device in a presented or deployed configuration.

An interior plan view of the vehicle rear door or tailgate 710 is illustrated in FIGS. 12A-12B. The vehicle rear door or tailgate 710 is shown pivoted upward about the pivot 711, in this example, a pair of hinges.

In FIG. 12A, the self-presenting device 712 including the handle 718 and the pair of handle arms 720 is shown in a stowed position, wherein the self-presenting device 712 is stowed within or substantially flush to the interior trim panel 722.

In FIG. 12B, the self-presenting device 712 including the handle 718 and the pair of handle arms 720 are shown in a presented or deployed position, wherein the self-presenting device 712 extends outwardly from the interior trim panel 722 to present the handle 718 to the user for use.

FIGS. 13A-13D schematically illustrates alternate configurations of the self-presenting device 712.

Figure 13A:
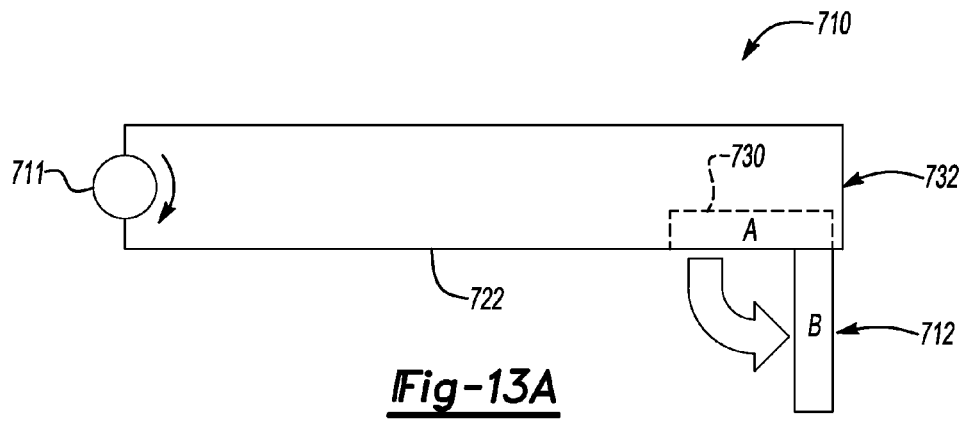
FIG. 13A is a side view of a tailgate including an exemplary embodiment of an active material enabled self-presenting device according to the present invention.

In FIG. 13A, the self-presenting device 712 is operable to transition from a stowed position A to a presented or deployed position B upon activation of the active material, such that the self-presenting device 712 pivots outward from a storage pocket 730 of the interior trim panel 722 and downward toward an end 732 of the vehicle rear door or tailgate 710.

Figure 13B:
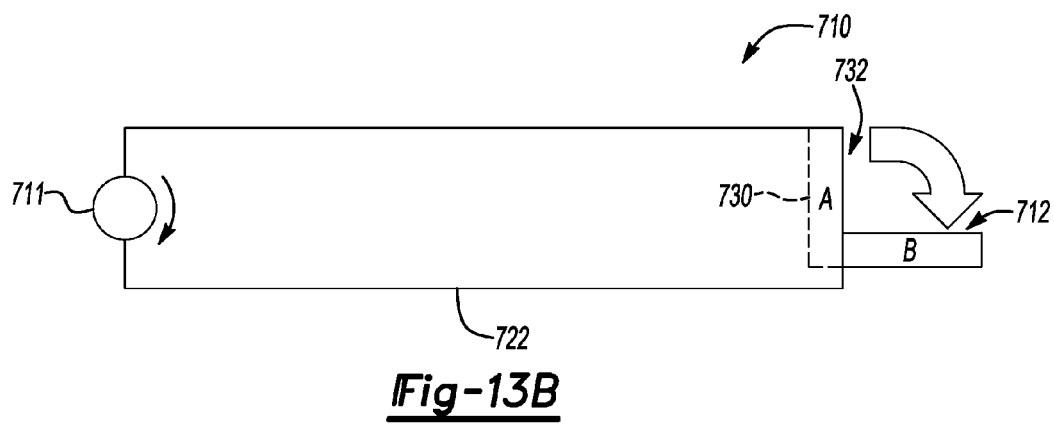
FIG. 13B is a side view of a tailgate including another exemplary embodiment of an active material enabled self-presenting device according to the present invention.

In FIG. 13B, the self-presenting device 712 is operable to transition from a stowed position A to a presented or deployed position B upon activation of the active material, such that the self-presenting device 712 pivots outward from the end 732 of the vehicle rear door or tailgate 710 and downward toward the interior trim panel 722.

Figure 13C:
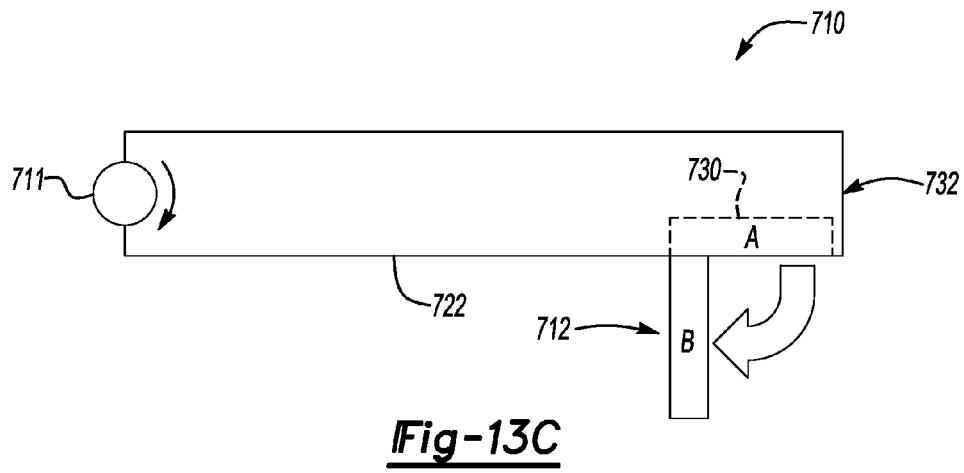
FIG. 13C is a side view of a tailgate including yet another exemplary embodiment of an active material enabled self-presenting device according to the present invention.

In FIG. 13C, the self-presenting device 712 is operable to transition from a stowed position A to a presented or deployed position B upon activation of the active material, such that the self-presenting device 712 pivots outward from the pocket 730 in the interior trim panel 722 and upward from the end 732 of the vehicle rear door or tailgate 710.

Figure 13D:
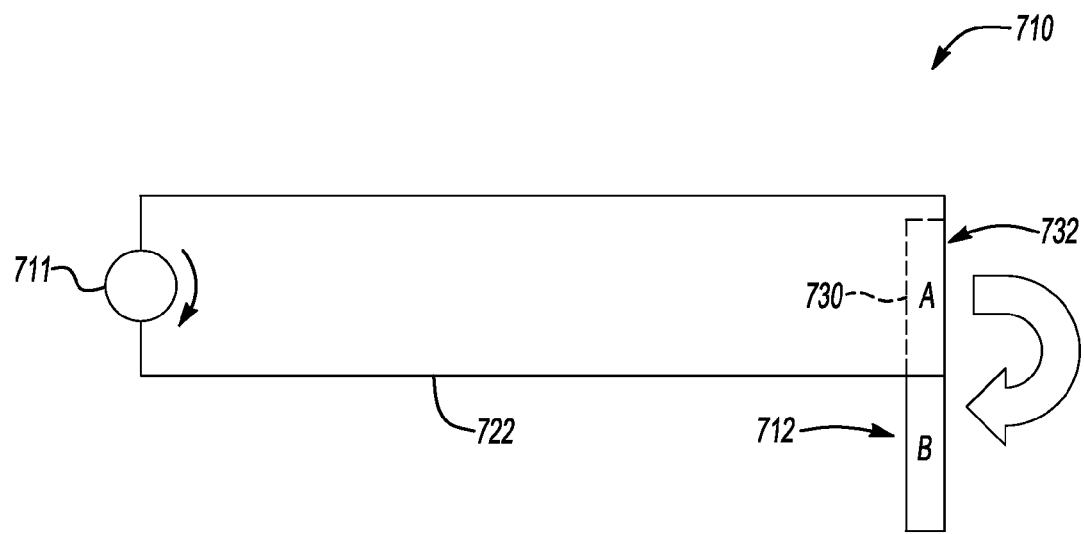
FIG. 13D is a side view of a tailgate including yet another exemplary embodiment of an active material enabled self-presenting device according to the present invention.

In FIG. 13D, the self-presenting device 712 is operable to transition from a stowed position A to a presented or deployed position B upon activation of the active material, such that the self-presenting device 712 pivots outward from the end 732 of the vehicle rear door or tailgate 710 and inward toward the interior trim panel 722.

Figure 13E:
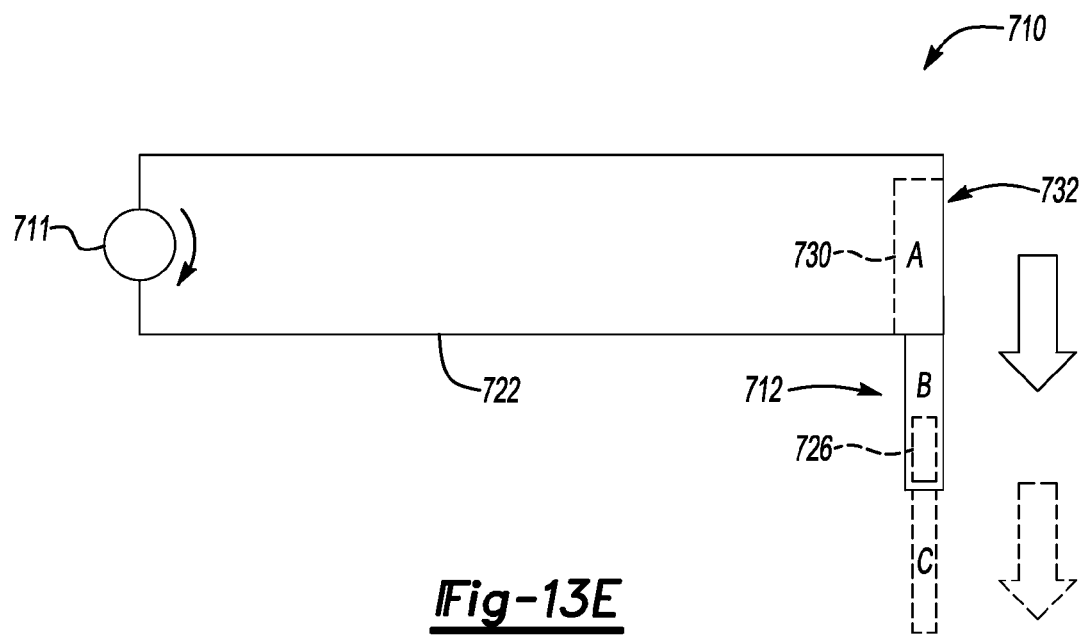
FIG. 13E is a side view of a tailgate including yet another exemplary embodiment of an active material enabled self-presenting device according to the present invention.

In FIG. 13E, the self-presenting device 712 is operable to transition from a stowed position A to a presented or deployed position B upon activation of the active material, such that the self-presenting device 712 slides downward from within the vehicle rear door or tailgate 710. In this example, the self-presenting device 712 includes a telescoping feature that further extends the self-presenting device to an extended presented or extended deployed position C upon activation of an active material 726, as illustrated previously in FIG. 11C.

A method of self-presenting a device in a vehicle interior or on the vehicle exterior comprises activating the active material in operative communication with the member, wherein the active material undergoes a change in at least one property upon receipt of the activation signal. The change in a property is effective to transition the member from a first form to a second form. Transitioning the member from the first form to the second form is configured to change the member from a stowed position within and/or against a vehicle interior/exterior component, such as a roof line, A-pillar, tailgate interior trim panel, or the like, to a presented position in the vehicle's interior compartment space (or outward from the exterior), wherein the member will now be accessible for use by a driver and/or passenger.

Further, a method of self-stowing a device in a vehicle interior or on the vehicle exterior comprises activating an active material in operative communication with a member, wherein the active material undergoes a change in at least on property upon receipt of an actuation signal. The change in a property is effective to transition the member from a first form to a second form. Transitioning the member from the first form to the second form is configured to transition the member from a presented position in a vehicle's interior compartment space (or outward from an exterior vehicle surface), wherein the member is accessible for use by a user to a stowed position within and/or against a vehicle interior/exterior component, such as a roof line, A-pillar, tailgate interior trim panel, or the like.

As discussed above, the self-presenting devices are stowed substantially flush with or within an associated vehicle component, for example, a vehicle door or tailgate, and presented or deployed upon activation of an active material. These devices, however, could all be configured as self-stowing devices, i.e. presented for use when the active material is in a passive state and stowed upon activation of the active material.

As described above, an activation device can be used to apply the activation signal to the active material(s) in an exemplary self-actuating device. The activation device can be operated in a variety of ways. For example, in one embodiment, use of a remote key fob, typically used to unlock a vehicle door, could also be configured to initiate the activation signal and present and/or stow one or more self-actuating devices. Likewise, a wireless signal transmitter in the key fob in combination with an activation device sensor could be used to automatically activate the active material when the key fob is brought into physical proximity to the self-actuating device, thereby eliminating the need to press key fob buttons.

In another embodiment, the activation signal could be manually activated. For example, inserting the vehicle key into a key hole in the vehicle door, or opening the door itself, could initiate the activation signal. Similarly, a push button or the like could be disposed adjacent the self-actuating device, wherein depressing the push button activates the activation signal in order to present and/or stow the device. In any of the above methods, the activation signal can be turned off by time-out of a timer in communication with the self-actuating device, or through the happening of some event, for example, closing of the vehicle door, closing of the liftgate or the vehicle being placed in gear, to deactivate the activation signal and return the member to the first form wherein the member is stowed, and optionally concealed, or presented.

Activation of the active materials can also be done manually, i.e., without the use of an activation device. By utilizing particular properties of the active materials, they can be activated by a vehicle operator or passenger. For example, using SMA as the active material, which has a superelastic property and will be discussed in more detail below with the rest of the active materials, pressure on the SMA portion of the concealment flap of the self-presenting device could induce a phase change in the SMA, whereby the modulus of the flap is lowered enough to be pressed in, which would allow access to the member, e.g. interior/exterior door handle.

To reiterate, although the active material enabled self-actuating devices illustrated are shown with respect to a vehicle grab handle, it is to be understood that the self-actuating device can be used for any functional component of a vehicle, other transportation means, or even non-transportation applications, such as luggage, containers, and the like. Such suitable self-actuating devices include, but are not limited to, garment hooks, release handles for the trunk, fuel-filler door, hood, and the like, handles for doors, covers, tailgates and the like, and other components where self-presentation may be desired.

As previously described, suitable active materials for the self-actuating devices include, without limitation, shape memory polymers (SMP), shape memory alloys (SMA), electroactive polymers (EAP), piezoelectric materials, ferromagnetic shape memory alloys, magnetorheological (MR) elastomers and electrorheological (ER) elastomers.

"Shape memory polymer" generally refers to a polymeric material, which exhibits a change in a property, such as an elastic modulus, a shape, a dimension, a shape orientation, or a combination comprising at least one of the foregoing properties upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMP are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMP comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMP with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMP exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMP in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the pad conform to a given surface. The maximum strain that the SMP can withstand in this case can, in some embodiments, be comparable to the case when the SMP is deformed above its thermal transition temperature.

Although reference has been, and will further be, made to thermoresponsive SMP, those skilled in the art in view of this disclosure will recognize that photoresponsive, moisture-responsive SMP and SMP activated by other methods may readily be used in addition to or substituted in place of thermoresponsive SMP. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Similar to shape memory polymers, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic Shape Memory Alloys (FSMA) are a subclass of SMA. FSMA can behave like conventional SMA materials that have a stress or thermally induced phase transformation between martensite and austenite. Additionally FSMA are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications, though a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

FSMA are alloys; often composed of Ni—Mn—Ga, that change shape due to strain induced by a magnetic field. FSMA have internal variants with different magnetic and crystallographic orientations. In a magnetic field, the proportions of these variants change, resulting in an overall shape change of the material. An FSMA actuator generally requires that the FSMA material be placed between coils of an electromagnet. Electric current running through the coil induces a magnetic field through the FSMA material, causing a change in shape.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity— (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Magnetorheological (MR) elastomers are a group of smart materials whose modulus can be controlled by the application of an external magnetic field. MR elastomer materials include, but are not intended to be limited to, an elastic polymer matrix comprising a suspension of ferromagnetic or paramagnetic particles. Suitable particles include iron; iron alloys, such as those including aluminum, silicon, cobalt, nickel, vanadium, molybdenum, chromium, tungsten, manganese and/or copper; iron oxides, including Fe2O3 and Fe3O4; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR elastomer composition.

Suitable polymer matrices include, but are not limited to, poly-alpha-olefins, natural rubber, silicone, polybutadiene, polyethylene, polyisoprene, and the like.

The application and functionality of the self-actuating device will determine which active material is best suited for the particular device. Factors such as force, displacement, actuation time, and the like can be used to determine which type of active material is most appropriate. For instance, where an application requires an activation time of about 1 second or greater, an SMA or SMP can be appropriate. Where an application requires shorter activation times, an EAP or MR elastomer can be used.

As stated above, the self-actuating devices as disclosed herein advantageously employ active materials to reversibly present and stow a functional component. The active material enabled self-actuating devices are lightweight, inherently robust, and lower in complexity than existing self-actuating devices with the same functionality, which can have multiple mechanical and/or electrical components prone to failure. Utilizing active materials to affect the feature changes of the member provides devices of increased simplicity, while reducing assembly volume and the energy requirements for activation due to higher energy densities. Moreover, the self-actuating devices described herein are also of low-cost and of easily adaptable design that can be integrated with limited changes to the existing vehicle interior/exterior structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A self-actuating device, comprising:
    a member in physical communication with a vehicle surface, wherein the member is configured to have at least a first form and a second form;
    an active material in operable communication with the member, wherein the active material is configured to undergo a change in at least one property upon receipt of an activation signal, wherein the change in the at least one property is effective to transition the member from one of the first form and the second form to the other of the first form and the second form; and
    a detent mechanism in physical communication with the member, wherein the detent mechanism is operable to maintain the member in one of the first form and the second form when the activation signal is discontinued.

2. The self-actuating device as recited in claim 1, wherein the first form is configured to stow the member and the second form is configured to present the member for use by a user.

3. The self-actuating device as recited in claim 2, wherein the active material is in a passive state when the member is in the first form and wherein the active material is in an active state when the member is in the second form.

4. The self-actuating device as recited in claim 3, further including a third form, wherein the second form presents the member at a first distance and the third form is configured to extend the member from the first distance to a second distance greater than the first distance.

5. The self-actuating device as recited in claim 4, wherein the member includes a handle portion and a pair of arm portions.

6. The self-actuating device as recited in claim 5, wherein the pair of arm portions are rotatable about an axis, to transition the member between the first form and the second form.

7. The self-actuating device as recited in claim 6, wherein the pair of arm portions are extendable to present the member in the third form.

8. The self-actuating device as recited in claim 1, wherein the first form is configured to present the member for use by a user and the second form is configured to stow the member.

9. The self-actuating device as recited in claim 8, wherein the active material is in a passive state when the member is in the first form and wherein the active material is in an active state when the member is in the second form.

10. The self-actuating device as recited in claim 1, wherein the detent mechanism includes a catch that engages the member to maintain the member in the one of the first form and the second form.

11. The self-actuating device as recited in claim 10, further including a second active material in operable communication with the catch, wherein the catch is slidable within a complementary cavity in response to a signal being applied to the second active material.

12. The self-actuating device as recited in claim 11, wherein the member is moveable within the catch upon manual application of a force.

13. The self-actuating device as recited in claim 1, further including a locking mechanism in physical communication with the member, wherein the locking mechanism is operable to lock the member in one of the first form and the second form when the activation signal is discontinued.

14. The self-actuating device as recited in claim 1, wherein the self-actuating device is installed in a vehicle rear door and the member is in one of the first form and the second form when the vehicle rear door is in an open configuration and the member is in the other of the first form and the second form when the vehicle rear door is in a closed configuration.

15. The self-actuating device as recited in claim 14, wherein the first form is configured to stow the member and the second form is configured to present the member for use by a user.

16. The self-actuating device as recited in claim 15, wherein the first form is configured to present the member for use by a user and the second form is configured to stow the member.

* * * * *